Figure 1:
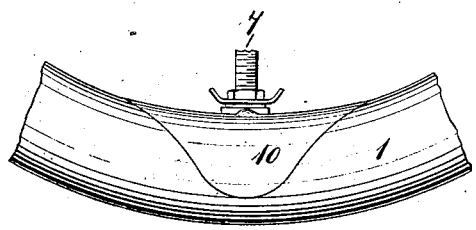

J. P. CLARE.
PROCESS OF MAKING TIRES FOR VEHICLES.
APPLICATION FILED JUNE 15, 1911.

1,033,230.

Patented July 23, 1912.

2 SHEETS—SHEET 1.

WITNESSES:
M. E. Flaherty
J. J. Kenneally

INVENTOR:
James P. Clare
by his atty—
Coale & Hayes

J. P. CLARE.
PROCESS OF MAKING TIRES FOR VEHICLES.
APPLICATION FILED JUNE 15, 1911.

1,033,230.

Patented July 23, 1912.

UNITED STATES PATENT OFFICE.

JAMES P. CLARE, OF STRATHAM, NEW HAMPSHIRE

PROCESS OF MAKING TIRES FOR VEHICLES.

1,033,230.  Specification of Letters Patent.  Patented July 23, 1912.

Application filed June 15, 1911. Serial No. 633,362.

*To all whom it may concern:*

Be it known that I, JAMES P. CLARE, of Stratham, in the county of Rockingham and State of New Hampshire, a citizen of the United States, have invented a new and useful Improvement in Processes of Making Tires for Vehicles, of which the following is a full, clear, and exact description, reference being had to the accompanying drawings, forming a part of this specification, in explaining its nature.

The process comprising my invention relates to that type of tire having a body and inside said body one or more partitions which assist in the formation inside the body of the tire of a plurality of separate inflatable compartments. By the term "tire" as used herein and in the appended claims I wish to include either an inflated tire in the generally accepted meaning of the term, or the inflatable inner portion thereof usually referred to as the "inner tube", especially where such is made a removable part and is contained within a protecting and retaining envelop or case.

A tube or tire of this kind necessarily involves in its making the formation of joints. The making of these joints is a very important item in the formation of the tire for in order to stand the strain which must necessarily at times come upon the joints during the inflation of the several compartments it is necessary that the joints be very strong and very carefully made. This means that the part or parts forming the body of the tire and partition or partitions must be brought together and united with especial care prior to vulcanizing. To do this the tire must be such that easy accessibility will be had to the points where the several joints are made during the formation of the tire in order that it may be seen when the parts are properly combined and brought together preparatory to vulcanizing. In order to secure strength and easy flexibility it is desirable that the partitions combine integrally with the body of the tire and that the joints be formed in the body of the tire outside the partitions, for if the partitions be jointed to the body the thickening of the partitions at the points of the joints is apt to interfere with their proper movement and cause undue stress upon the joints as the compartments of the tube or tire are successively inflated.

It is accordingly the object of my invention to provide a tire possessing the capabilities above referred to and especially one in which easy access is had to the joints for inspecting the same during the initial formation of the tube or tire preparatory to vulcanizing.

My invention can best be seen and understood by reference to the drawings in which—

Figure 2:
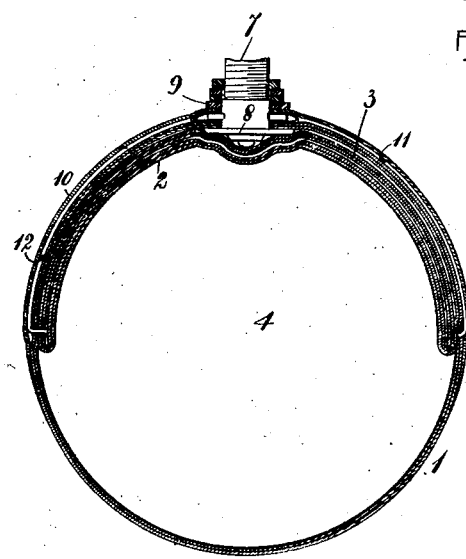
Figure 3:
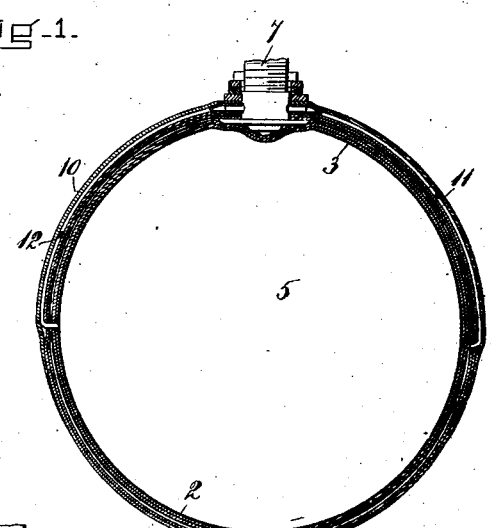
Figure 4:
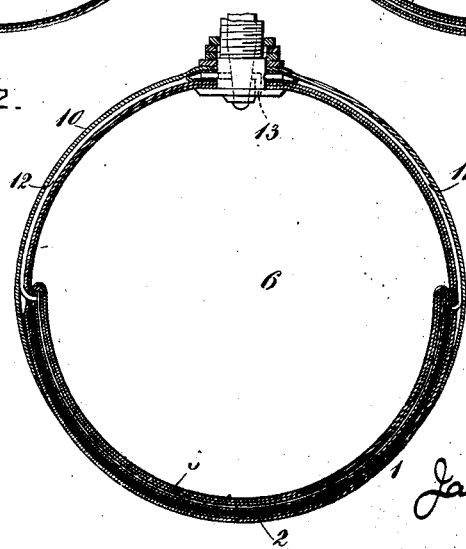
Figure 5:
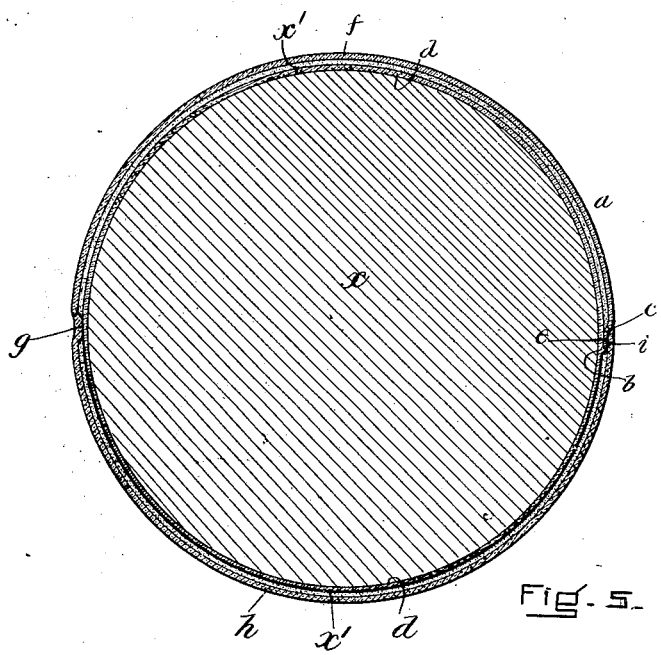
Figure 6:
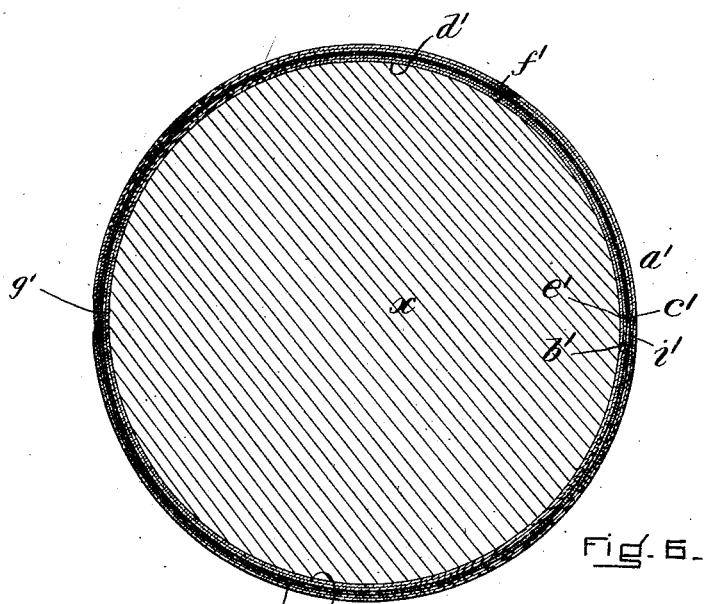

Figure 1 shows a portion of the tube or tire in side elevation. Figs. 2, 3 and 4 are sections showing, respectively, the various compartments of the tube or tire and manner of forming and inflating the same. Fig. 5 shows in cross section a mandrel and a sheet of rubber wound thereon for illustrating the manner in which a tube or tire embodying my invention is formed. Fig. 6 shows substantially the same as Fig. 5 excepting that the tube or tire is formed in a slightly modified manner, to which special reference will hereinafter be made.

Referring to the drawings:—1 represents the exterior or body of the tire; 2 and 3 the respective partitions inside said body. Both the body of the tire and the partitions are made of rubber or other suitable material. The body of the tire is made to assume a substantially tubular form when the tire is completed and the separate partitions both extend from the opposite interior sides of the body of the tire of which they form an integral part as will be hereinafter explained. They are so arranged as to form with one another and the body of the tire the three separate inflatable compartments 4, 5 and 6, the inflation of any one of which operates to effect a proper inflation of the tire.

As may be seen by reference to Figs. 2, 3 and 4, the separate compartments are obtained by moving the partitions within the body of the tire, either one or both partitions being capable of being moved outwardly in either direction against the interior of said body when any one of said compartments is inflated. In order that no undue strain may come upon the partitions at such time they unite with the body of the tire at points substantially opposite one another at about the diametrical center of said body when the tire is inflated and the partitions are of such size or degree of looseness as will enable each one of them to assume a position conformatory with the interior side of the body against which it is moved.

Attention has already been directed to the fact that the body of the tire and partitions are integrally connected with one another, or, in other words, are formed from the same piece or sheet of rubber. This can best be seen and understood by reference to Figs. 5 and 6 which illustrate the manner in which the body of the tire and separate partitions are formed. In these figures $a$ represents a sheet of rubber of which $b$ and $c$ represent its respective ends. From the point of its end $b$ the sheet is wrapped completely around a mandrel $x$ by a portion $d$ of the sheet so that it will overlap the edge $b$. The overlapping portion of the sheet is secured to that portion thereof just adjacent the edge $b$ by a joint $e$. The overlapping portion of the sheet is then further wrapped around the mandrel and portion $d$ of the sheet thereon by an overlapping portion $f$ which extends to a point diametrically opposite the joint $e$ where the overlapping portion $f$ of the sheet is secured to the lapped portion $d$ by a joint $g$. The overlapping portion of the sheet is then continued from the joint $g$ further around the mandrel and portion of the sheet $d$ thereon by an overlapping portion $h$ which extends to a point adjacent the joint $e$ where the overlapping portion $h$ of the sheet is secured to the lapped portion thereof by a joint $i$.

The portion $d$ of the sheet forms the two partitions 2 and 3, while the portions $f$ and $h$ of the sheet form the body 1 of the tire. The joints $e$, $g$ and $i$ are made by bringing those overlapping portions of the sheet which form the respective joints into contact with one another and then vulcanizing. As is customary in the formation of all tires, the sheet from which the tires are formed is preparatory to vulcanizing of such consistency that when any part thereof is brought into contact with another part it will stick and a joint be formed when the sheet is vulcanized. So in the present case the joints are initially formed by bringing the overlapping portions of the sheet into contact with the lapped portions thereof at the points where the joints are to be formed, the other overlapping portions of the sheet being kept from adhering to the lapped portions thereof by the interposition of any insulating sheet material $x^1$ such as certain kinds of paper, as is well known to those skilled in the art.

The joints are successively formed as the sheet is progressively wrapped around the mandrel and accordingly immediate access is had to each successive joint and one is enabled to ascertain whether a proper initial bond is formed between the parts for forming the respective joints prior to vulcanizing. After vulcanizing the formed sheet is removed from the mandrel, the pieces $x^1$ removed, the formed sheet cut into proper lengths and the ends of the cut lengths brought together and united as is customary in the formation of any tire.

In Fig. 6 a slightly modified method of forming the tire is shown although the ultimate construction of the tire is substantially the same as before described. By reference to Fig. 5 it will be seen that the sheet of rubber $a$ from which the body of the tire and partitions are formed is of a single thickness of quite thick rubber, while in Fig. 6 the parts of the tire are all formed of a double thickness of rubber, or, in other words, two layers of relatively thin rubber which is an advantage as it tends to cure any defects that may exist in any portion of the sheet. $a^1$ in Fig. 6 represents the sheet of rubber of which $b^1$ and $c^1$ represent its respective ends. From the point of its end $b^1$ the sheet is wrapped twice around the mandrel $x$ and the successive wrappings made to adhere to one another forming the part $d^1$. The wrapping of the sheet is then continued around the mandrel and part $d^1$ from a point $e^1$ by an overlapping part $f^1$ which extends over a sheet of insulating material $x^1$ interposed between the part $f^1$ and the part $d^1$. This insulating material extends, however, only about half way around the mandrel or from the point $e^1$ to a point diametrically opposite this point where the overlapping part $f^1$ of the sheet is made to adhere to the side of the part $d^1$ forming a joint $g^1$. From the joint $g^1$ the sheet is further extended by a part $h^1$ passed around the mandrel over an insulating sheet $x^2$ which is placed around the mandrel over the part $d^1$ between the joint $g^1$ and a point $i^1$ diametrically opposite the joint where the sheet laps onto the part $d^1$ and is joined thereto just adjacent the point $e^1$. The sheet is then again wrapped entirely around the mandrel over the parts $f^1$ and $h^1$ and made to adhere thereto reinforcing these parts by such adherence. The parts $d^1$, $f^1$ and $h^1$ of Fig. 6 correspond with the parts $d$, $f$ and $h$ of Fig. 5 and likewise form the body and partitions of the tire as before described.

The separate inflatable compartments 4, 5 and 6 may be inflated by any suitable means of inflation. I have shown the tire provided with a stem 7 which is affixed to the body of the tire by means of clamps 8 and 9, respectively, the clamp 8 being arranged on the end of the stem inside the body of the tire or within the compartment 6 and the clamp 9 arranged on the outside of the body to bear against it for holding the stem in place. The body of the tire at the point of the stem is preferably reinforced by a patch 10 applied thereto. This patch may be applied to the body of the tire when it is formed and prior to vulcanizing in order that all parts of the tire requiring it may be vulcanized at the same time.

Connecting with the interior of the stem and leading into the separate compartments are passages 11, 12 and 13, respectively. The passages 11 and 12 extend from the stem outside the body of the tire between it and the patch on opposite sides and communicate with the respective compartments 4 and 5 at the points where the partitions connect with the body of the tire substantially as shown in Figs. 2 and 3, while the passage 13 extends from the stem of the tire directly into the compartment 6 as shown in Fig. 4. The passages 11, 12 and 13 connecting with the stem and leading into the various compartments are controlled at the point of the stem by any suitable valvular mechanism inside said stem or such as I have shown and described in my application for Letters Patent of the United States filed June 15, 1911 Serial No. 633,361, which permits air to be compressed in any one of the compartments for inflating the tire independently of the other compartments. In practice the compartment 4 is first inflated and then the compartments 5 and 6 in succession as punctures occur as described in said application.

Having thus fully described my invention, I claim and desire to secure by Letters Patent of the United States:—

The process of initially forming a tire preparatory to vulcanizing, which tire has a body and inside said body separate inflatable compartments, consisting in wrapping a sheet of rubber into the form of a tube and then continuing the wrapping of the sheet around the tube in the form of a portion or portions which lap around and over the tube and uniting the overlapping portion or portions of the sheet to the tube only on opposite sides of said tube.

JAMES P. CLARE.

Witnesses:
JASPER R. SWAIN,
GEORGE W. RAND.